United States Patent
Cosgrove et al.

(10) Patent No.: US 11,420,817 B2
(45) Date of Patent: Aug. 23, 2022

(54) PRESSURE VACUUM VENT

(71) Applicants: Theodore Cosgrove, St. Louis, MO (US); Arthur C. Fink, Jr., Lonedell, MO (US); Noah Brown, Labadie, MO (US)

(72) Inventors: Theodore Cosgrove, St. Louis, MO (US); Arthur C. Fink, Jr., Lonedell, MO (US); Noah Brown, Labadie, MO (US)

(73) Assignee: Husky Corporation, Pacific, MO (US)

( * ) Notice: Subject to any disclaimer, the term of this patent is extended or adjusted under 35 U.S.C. 154(b) by 344 days.

(21) Appl. No.: 16/873,169

(22) Filed: Feb. 19, 2020

(65) Prior Publication Data
US 2020/0262643 A1    Aug. 20, 2020

Related U.S. Application Data

(60) Provisional application No. 62/918,945, filed on Feb. 20, 2019.

(51) Int. Cl.
*F16K 17/196* (2006.01)
*B65D 90/34* (2006.01)

(52) U.S. Cl.
CPC ............ *B65D 90/34* (2013.01); *F16K 17/196* (2013.01)

(58) Field of Classification Search
CPC . B65D 90/34; Y10T 137/7895; F16K 17/196; F16K 17/19

USPC ......................................................... 137/859
See application file for complete search history.

(56) References Cited

U.S. PATENT DOCUMENTS

| | | | |
|---|---|---|---|
| 2,488,968 A * | 11/1949 | Devorss, Jr. | F16K 41/12 92/99 |
| 3,032,060 A * | 5/1962 | Huffman | F16K 17/06 137/859 |
| 4,147,096 A | 4/1979 | Caswell | |
| 4,212,315 A | 7/1980 | Fahl et al. | |
| 4,460,013 A | 7/1984 | Milo | |
| 5,141,020 A | 8/1992 | Sunderhaus et al. | |
| 5,449,018 A * | 9/1995 | Harris | B60K 15/03519 137/859 |
| 5,464,466 A | 11/1995 | Nanaji et al. | |
| 5,494,409 A | 2/1996 | Webb et al. | |
| 5,640,999 A | 6/1997 | Wood | |
| 5,957,157 A | 9/1999 | Mitchell et al. | |
| 10,690,256 B2 * | 6/2020 | Bock | F16K 17/048 |
| 10,782,712 B2 * | 9/2020 | Bock | B29C 66/73921 |
| 2003/0089409 A1 * | 5/2003 | Morimoto | F16K 15/144 137/859 |
| 2004/0074538 A1 | 4/2004 | Ortenzi et al. | |
| 2020/0149647 A1 * | 5/2020 | Kuehn | F16K 17/196 |

* cited by examiner

*Primary Examiner* — Jessica Cahill
(74) *Attorney, Agent, or Firm* — Paul M. Denk

(57) ABSTRACT

A pressure vacuum vent is disclosed which has a pressure plate having an opening, a diaphragm positioned on the pressure plate, a sealing ring for holding the diaphragm to the pressure plate, a sealing plate positioned on the diaphragm, a retaining ring for retaining the sealing ring, a screw having a cap having a vent opening, and a spring positioned between the cap and the sealing plate.

8 Claims, 8 Drawing Sheets

PRESSURE VACUUM VENT

CROSS REFERENCE TO RELATED APPLICATION

This non-provisional patent application claims priority to the provisional patent application having Ser. No. 62/918,945, filed on Feb. 20, 2019.

FIELD OF THE DISCLOSURE

This disclosure generally relates to a pressure vent for a fuel storage tank, and in particular to a pressure vacuum vent which provides for increased air flow through the vent and for pressure to be more quickly stabilized within a storage tank.

BACKGROUND OF THE INVENTION

Fuel storage tanks, such as underground tanks used to store gasoline at gas stations, are subject to varying pressures which can affect the ability of fuel pumps to operate. The fuel storage tanks are provided with vents which allow excess pressure to be released when the fuel tank exceeds a predetermined maximum pressure. Excess pressure can be caused by vacuum assist refueling when more vapors are drawn into the fuel storage tank than fuel that is being dispensed, by not hooking up the vapor return hose to a transfer tank when refueling the tank, or by atmospheric conditions. In addition, negative pressure or partial vacuums can be created in the fuel storage tank by dispensing more fuel than vapors that are drawn in (during vacuum assist refueling). In such a situation, the tank must be re-pressurized (i.e., the vacuum must be dissipated). It is also known that current vents have trouble drawing enough vacuum when all of the pumps at the gas station are being used. When this occurs, the pressure within the fuel storage tank takes some time to stabilize.

Typical vent devices use a direct acting poppet valve that is entirely effected by the pressure from the storage tank. Such vent devices use the same poppet valve to respond to over-pressure and under-pressure (vacuum) situations. Thus, there is only one pressure differential setting for the current vent devices. However, it is generally desirable to have a first pressure setting or differential to release excess pressure and a second pressure differential to release or dissipate a vacuum. It is also desirable to have at least two overpressure settings to release vapors at a first pressure and at a second, higher pressure. Thus, the pressure at which the valves open are the same and often correlate to the lower pressure. This lower pressure leads to a seal which is not as tight as it could be. Also, with typical vents, vibrations or minor imperfections on the sealing surface will open or create a leakage path through the poppet valve, and will prevent the vent from maintaining the required pressure in the fuel storage tank.

A known vacuum vent, such as the one disclosed in U.S. Pat. No. 5,957,157, has a vent plate assembly that has an arm facing into an inside of a chamber. As the pressure in the chamber rises the pressure pushes on a diaphragm. Movement of the diaphragm compresses a spring. As the spring compresses a plate assembly is pulled down and the arm pivots up. This allows air to flow through an opening to alleviate pressure within a fuel storage tank. Although such a vacuum vent has been useful the vacuum vent is a difficult device to construct. Further, the vacuum vent has trouble drawing enough vacuum when all of the pumps at a gas station are being used.

The present disclosure is designed to obviate and overcome many of the disadvantages and shortcomings experienced with prior pressure vacuum vents. The present disclosure provides a pressure vacuum vent that provides for increased air flow through the vent. Moreover, the present disclosure is related to a pressure vacuum vent that is designed and constructed to be easier to manufacture. Further, the present disclosure is directed to a pressure vacuum vent that quickly stabilizes pressure within a fuel storage tank. Also, the present disclosure provides a pressure vacuum vent that draws enough vacuum when all of the pumps at a gas station are being used.

SUMMARY OF THE INVENTION

The present disclosure is a pressure vacuum vent which comprises a pressure plate having an opening, a diaphragm positioned on the pressure plate, a sealing ring for holding the diaphragm to the pressure plate, a sealing plate positioned on the diaphragm, a retaining ring for retaining the sealing ring, a screw holding a cap having a vent opening, and a spring positioned between the cap and the sealing plate.

In another form of the present disclosure, a pressure vacuum vent comprises a pressure plate having a plurality of openings, a diaphragm positioned on the pressure plate and for covering the openings, a sealing ring for holding the diaphragm over the pressure plate, a sealing plate positioned over the diaphragm, the sealing plate having a central opening, a retaining ring for retaining the sealing ring, a screw holding a cap having a plurality of vent openings, and a spring positioned between the cap and the central opening of the sealing plate.

In yet another form of the present disclosure, a pressure vacuum vent comprises a pressure plate having an opening and a circular wall that extends upwardly from the pressure plate, a diaphragm positioned on the pressure plate with the diaphragm having a peripheral edge, a sealing ring having a circular groove for sealing the peripheral edge of the diaphragm within the circular wall of the pressure plate, a sealing plate positioned on the diaphragm, a retaining ring for retaining the sealing ring, a screw holding a vent lid having a vent opening, and a spring positioned between the cap and the sealing plate.

The present disclosure provides a pressure vacuum vent that allows increased air flow through the vent.

The present disclosure is directed to a pressure vacuum vent to accurately control pressure within a fuel storage tank.

The present disclose provides a pressure vacuum vent that is simple to operate and provides highly reliable results to dispense fuel from a storage tank.

The present disclosure provides a pressure vacuum vent that may be combined with other pressure vacuum vents to respond to over and under pressure conditions within a fuel storage tank.

The present disclosure is also directed to a pressure vacuum vent that may be combined with other pressure vacuum vents in a single housing.

The present disclosure further provides a pressure vacuum vent that may be employed to accurately control low pressure settings within a fuel storage tank.

The present disclosure provides a pressure vacuum vent that is used to prevent leakage below the pressure setting of the vent.

The present disclosure is further directed to a pressure vacuum vent that may be employed to accurately control high pressure settings within a fuel storage tank.

These and other advantages of the present disclosure will become apparent to those skilled in the art after considering the following detailed specification in conjunction with the accompanying drawings.

DESCRIPTION OF THE PREFERRED EMBODIMENT

Figure 1:
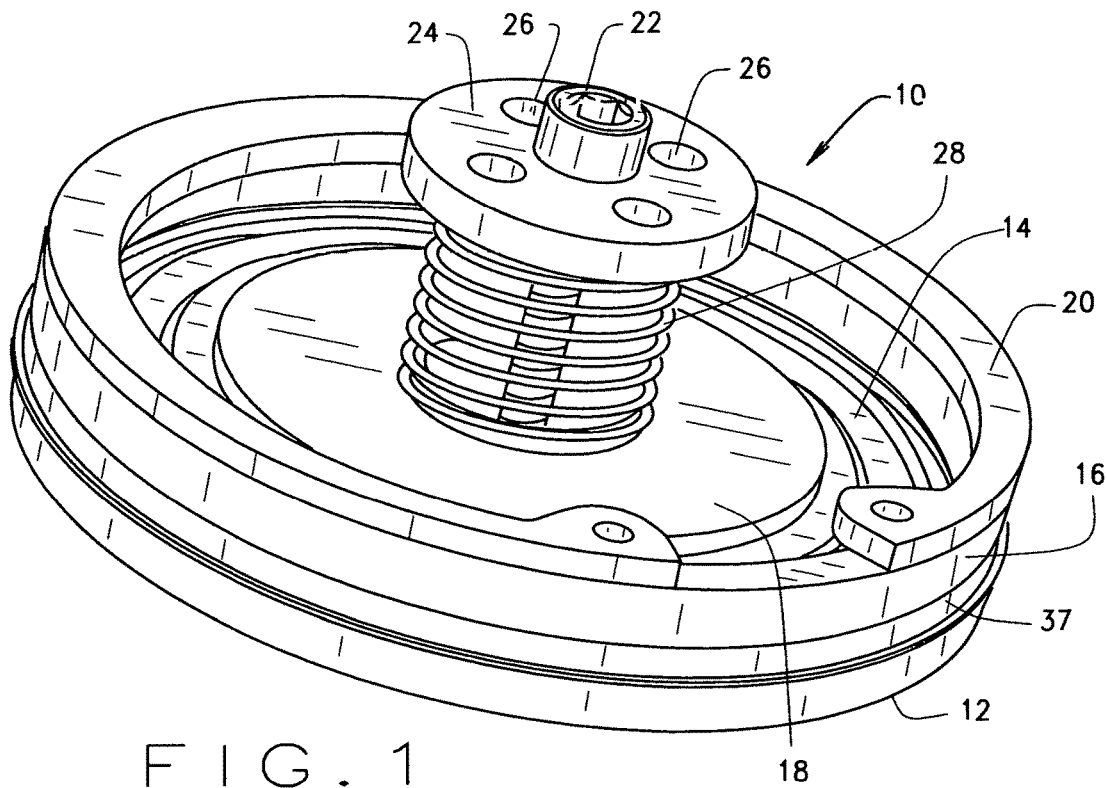
FIG. 1 is a top perspective view of a pressure vacuum vent constructed according to the present disclosure, being in a closed position.

Referring now to the drawings, wherein like numbers refer to like items, number 10 identifies a preferred embodiment of a pressure vacuum vent constructed according to the present disclosure. With reference now to FIG. 1, the pressure vacuum vent 10 is shown to comprise a pressure plate 12, a diaphragm 14 positioned on the pressure plate 12, a sealing ring 16 for holding the diaphragm 14 to the pressure plate 12, which forces the edge 37 and the outside diameter of the diaphragm 14 to seal on the wall of the housing, sealing plate 18 positioned on the diaphragm 14, a retaining ring 20 for retaining the sealing ring 16, a screw 22 having a vent lid or cap 24 having a vent opening or openings 26, and a spring 28 positioned between the cap 24 and the sealing plate 18. As will be explained further herein, the pressure vacuum vent 10 is shown in a closed position.

Figure 2:
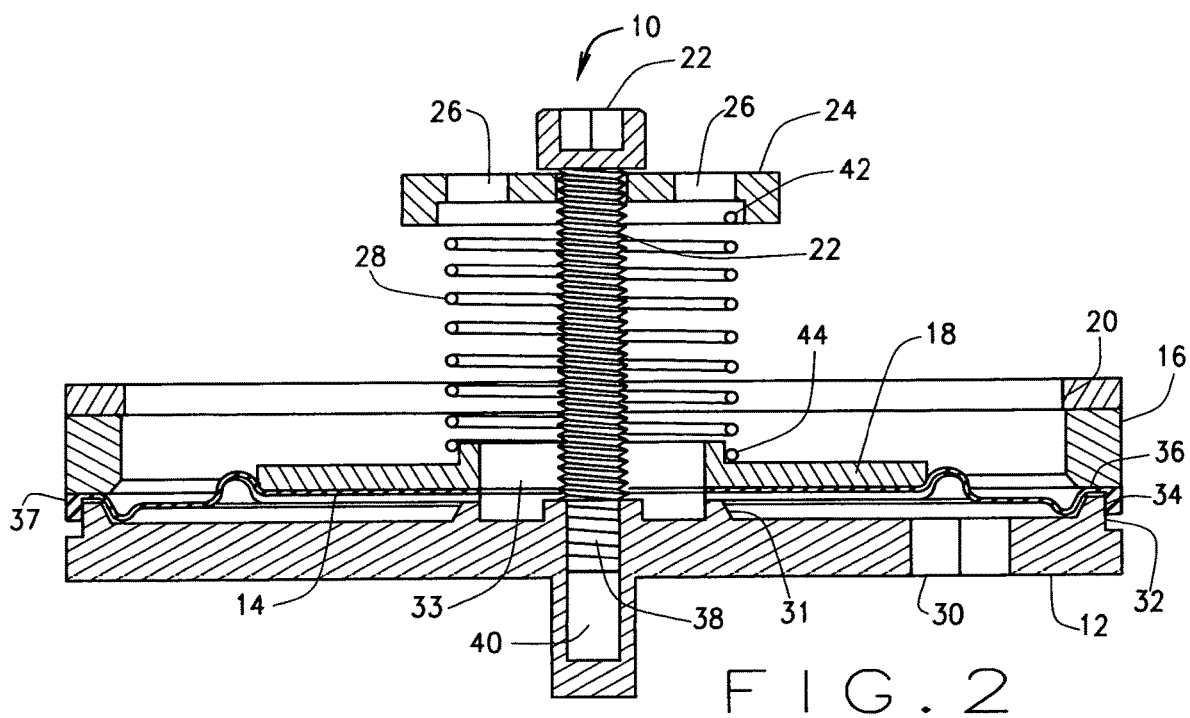
FIG. 2 is a cross-sectional view of the pressure vacuum vent constructed according to the present disclosure being in a closed position.

FIG. 2 illustrates a cross-sectional view of the pressure vacuum vent 10 shown in a closed position. The pressure vacuum vent 10 has the pressure plate 12 and the diaphragm 14 positioned on the pressure plate 12. The sealing ring 16 is used for holding the diaphragm 14 to the pressure plate 12. When pressed down it also forces the edge 37 of diaphragm 14 out to seat against the housing. The sealing plate 18 is positioned on the diaphragm 14 and the retaining ring 20 is used for retaining the sealing ring 16. The screw 22 has the cap 24 having the vent opening or openings 26 and the spring 28 positioned between the cap 24 and the sealing plate 18. The pressure plate 12 has an opening 30 through which pressure and vacuums are dissipated from a fuel storage tank (not shown), as will be described. A circular wall 32 extends upwardly from the pressure plate 12 for receiving and capturing groove 36 of the diaphragm 14. The screw 22 has a lower threaded end 38 that is threaded into a bore 40 formed in the pressure plate 12. As can be appreciated, the cap 24 under the screw 22 is used to capture an upper end 42 of the spring 28. A lower end 44 of the spring 28 is captured by the sealing plate 18. The spring 28 is shown in an uncompressed state. In the closed state as shown in FIG. 2 the pressure from the fuel storage tank (not shown) is not enough to compress the spring 28. The spring 28 presses down on the sealing plate 18 and the diaphragm 14 presses down on the ledge 31 of the pressure plate 12, this seals or prevents any air from flowing through the opening 33.

Figure 3:
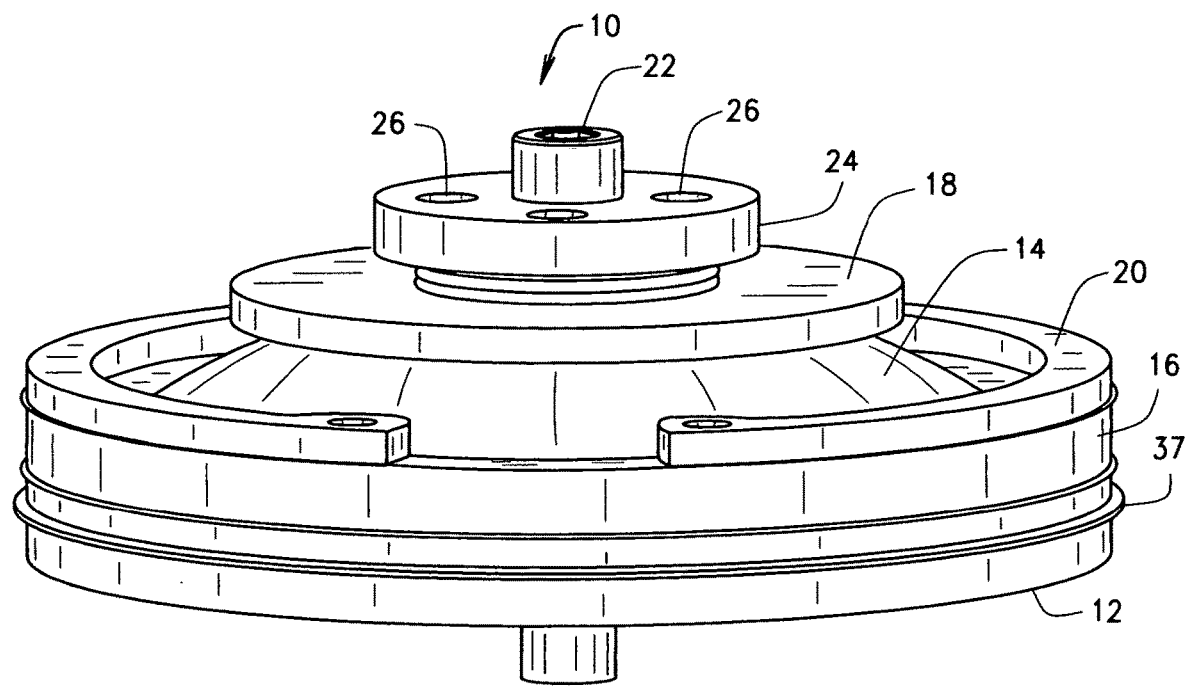
FIG. 3 is a side perspective view of the pressure vacuum vent constructed according to the present disclosure shown in an opened position.

Referring now to FIG. 3, the pressure vacuum valve 10 is shown in an opened state which allows vacuum or pressure to be dissipated. In particular, as pressure in the fuel storage tank rises air flows through the opening 30 (FIG. 2) in the pressure plate 12 which applies a force against the diaphragm 14. When the force is great enough to overcome the force of spring 28, the diaphragm 14 and the sealing plate 18 will start to compress the spring 28. This creates a gap 31 (FIG. 2) so air can flow through 33 (FIG. 2). As the pressure increases the diaphragm 14 expands which moves or pushes the sealing plate 18 upwardly more. When the spring 28 is fully compressed air that could be trapped inside a cylinder formed by the sealing plate 18, the spring 28, and the cap 24 is allowed to escape through the vent openings 26 formed in the cap 24. In this manner, pressure or vacuum can be alleviated or reduced. The pressure vacuum valve 10 is also shown to comprise the sealing ring 16 positioned over the diaphragm 14 for holding the diaphragm 14 against the pressure plate 12. The diaphragm 14 is shown in an expanded state. The sealing plate 18 is positioned on the diaphragm 14 and prevents air from escaping during the time that air flows through the opening 30. The retaining ring 20 is used for retaining the sealing ring 16. The screw 22 on the cap 24 having the vent opening or openings 26 and the spring 28 positioned between the cap 24 and the sealing plate 18. The peripheral edge 37 of the diaphragm 14 is shown extending out from between the pressure plate 12 and the sealing ring 16. This edge 37 and the outside of diaphragm 14 seal against the housing.

Figure 4:
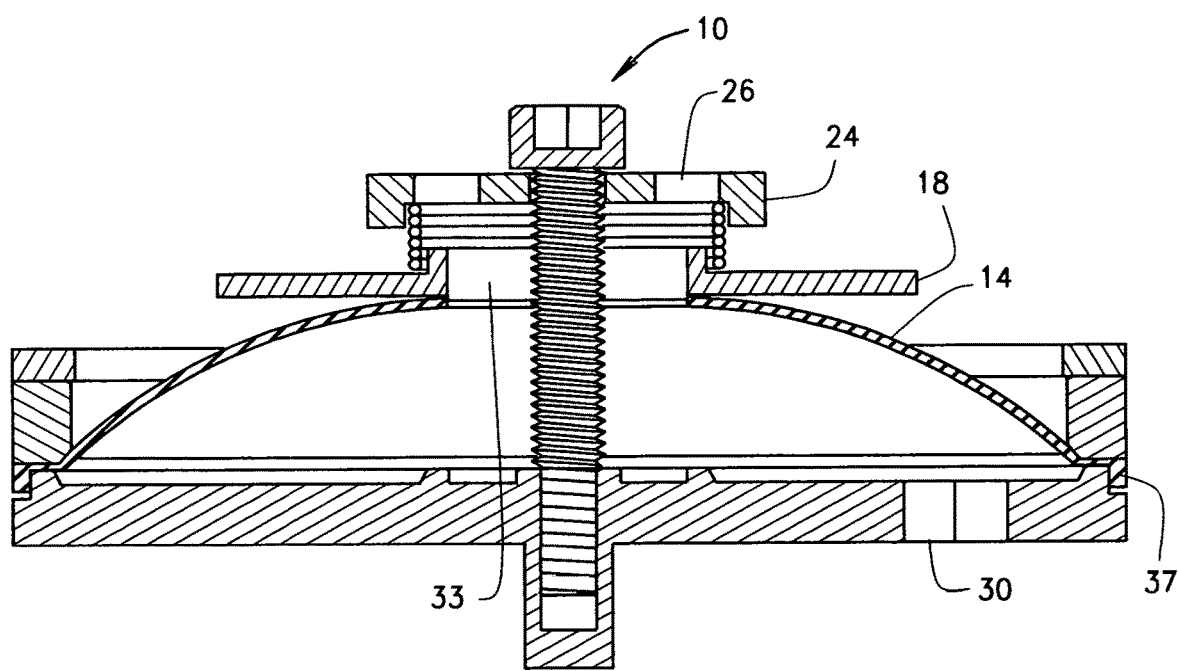
FIG. 4 is a cross-sectional view of the pressure vacuum vent constructed according to the present disclosure shown in the opened position.

FIG. 4 depicts a cross-sectional view of the pressure vacuum vent 10 in the opened position. The diaphragm 14 is shown in a fully expanded state which causes the sealing plate 18 to compress the spring 28. Any air flowing through the opening 33 will be allowed to flow out of the openings 26 in the cap 24. Again, in this manner, pressure or vacuum within a fuel storage tank can be alleviated or reduced.

Figure 5:
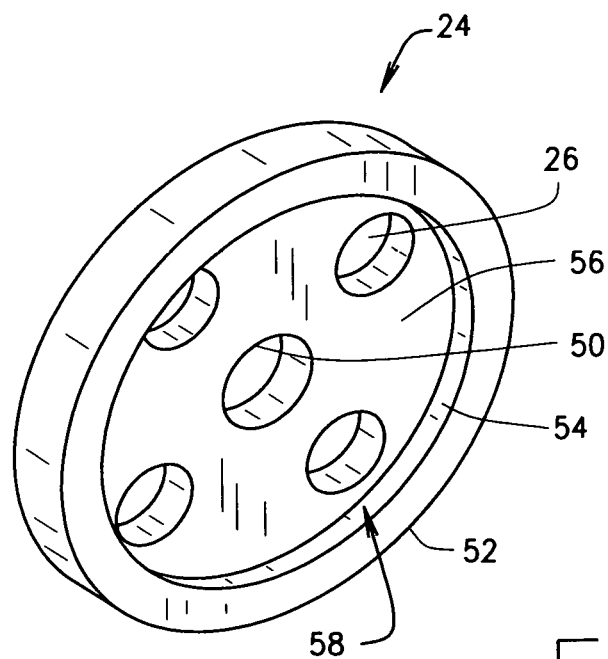
FIG. 5 is a bottom perspective view of a vent lid or cap which is part of the pressure vacuum vent of the present disclosure.

With reference now to FIG. 5, a bottom perspective view of a vent lid or cap 24 is illustrated. The cap 24 has a central opening 50 that is used to receive the screw 22 there through. The cap 24 also has the vent openings 26. The cap 24 also has a circular ring 52 having a side 54 and a bottom 56. The side 54 and the bottom 56 form an area or shoulder 58 to receive or capture the upper end 42 (FIG. 2) of the spring 28.

Figure 6:
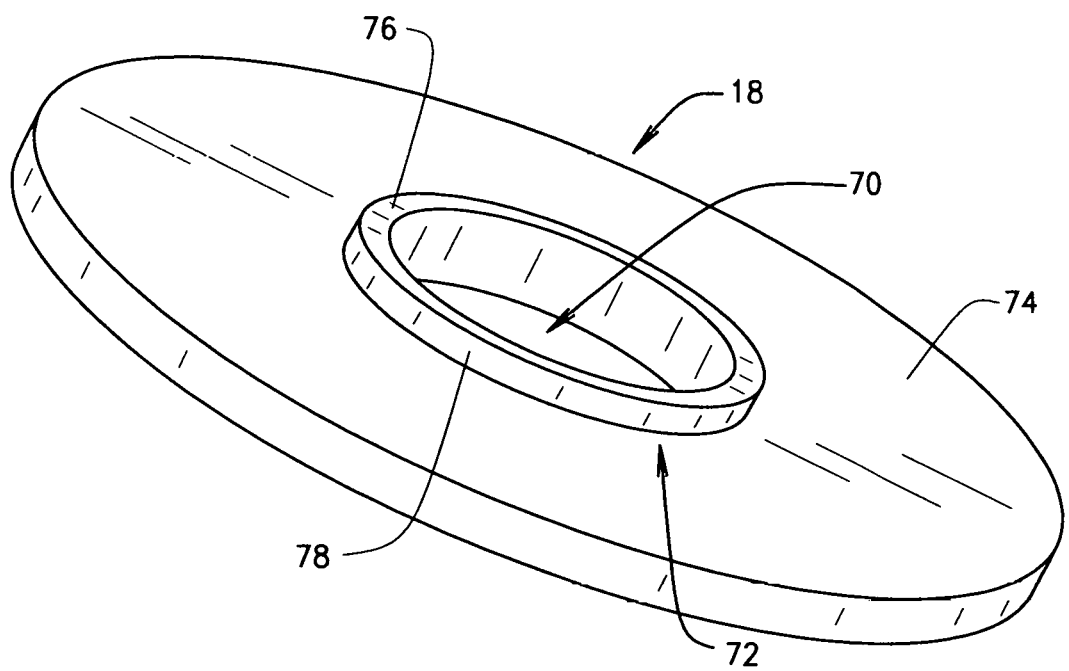
FIG. 6 is a perspective view of a sealing plate which is part of the pressure vacuum vent of the present disclosure.

FIG. 6 shows a top perspective view of the sealing plate 18. The sealing plate 18 comprises a central opening 70 having a circular ring 72 extending up from a top surface 74. The circular ring 72 has a top ring portion 76 and a side ring portion 78. The side ring portion 78 and the top surface 74 are used to receive or capture the lower end 44 (FIG. 2) of the spring 28.

Figure 7:
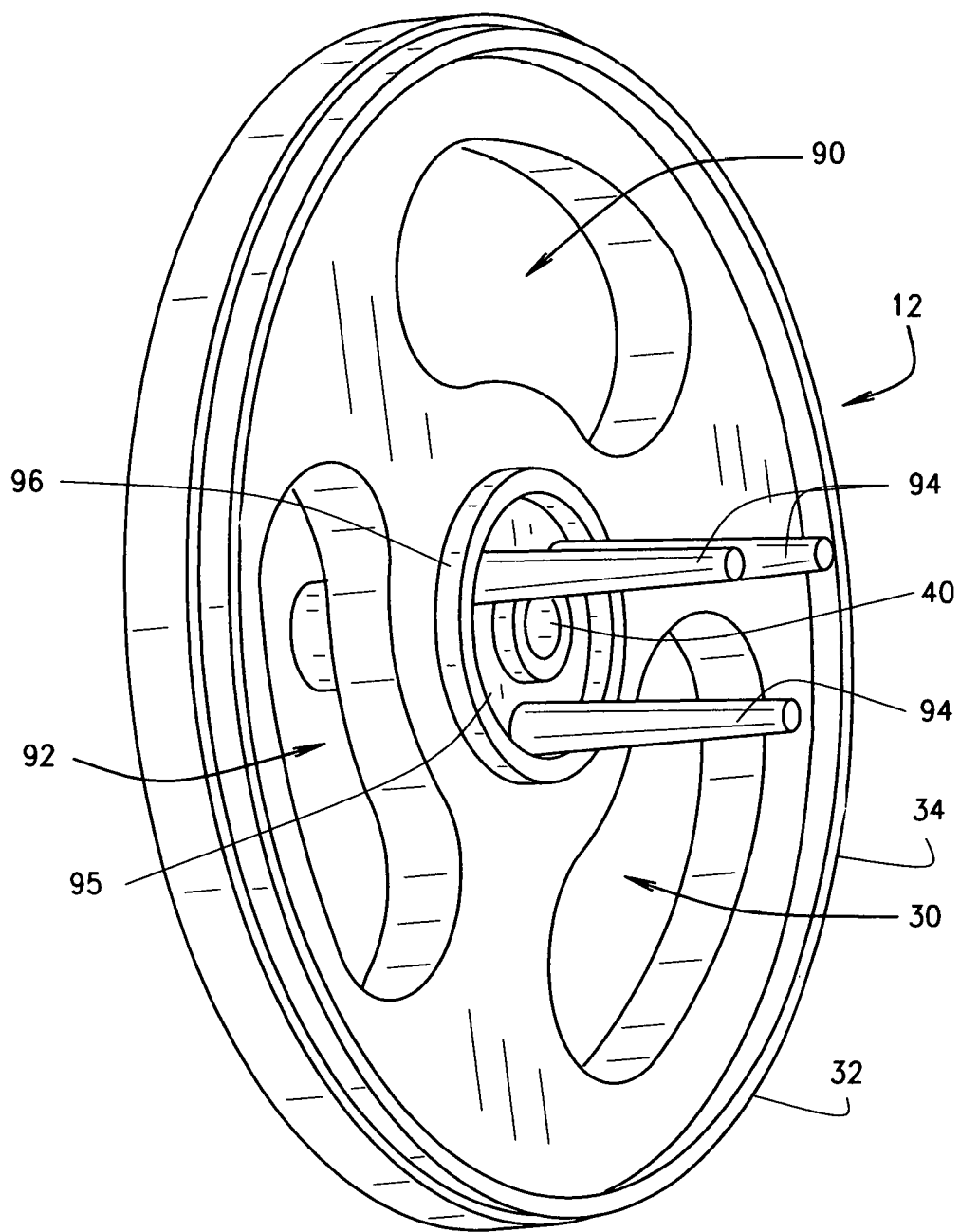
FIG. 7 is a perspective view of a pressure plate which is part of the pressure vacuum vent of the present disclosure.

Referring now to FIG. 7, a perspective view of the pressure plate 12 is illustrated. The pressure plate 12 has the opening 30 formed therein. A pair of other openings 90 and 92 are also formed in the plate 12. As should be appreciated more openings of other shapes may be formed in the plate 12, if required. The bore 40 is also shown and the bore 40 may be threaded to receive the lower threaded end 38 (FIG. 2) of the screw 28. The pressure plate 12 also has a number of prongs, posts, or legs 94 that extend upwardly from the pressure plate 12. The prongs 94 may be used to center the sealing plate 18 therein. A circular flange 96 also extends upwardly from the pressure plate 12. The top 95 of flange 96 is used as a sealing ledge. The circular wall 32 is also shown extending upwardly from the pressure plate 12. The top of this wall 34 is a sealing surface between the diaphragm 12 and the sealing ring 16.

Figure 8:
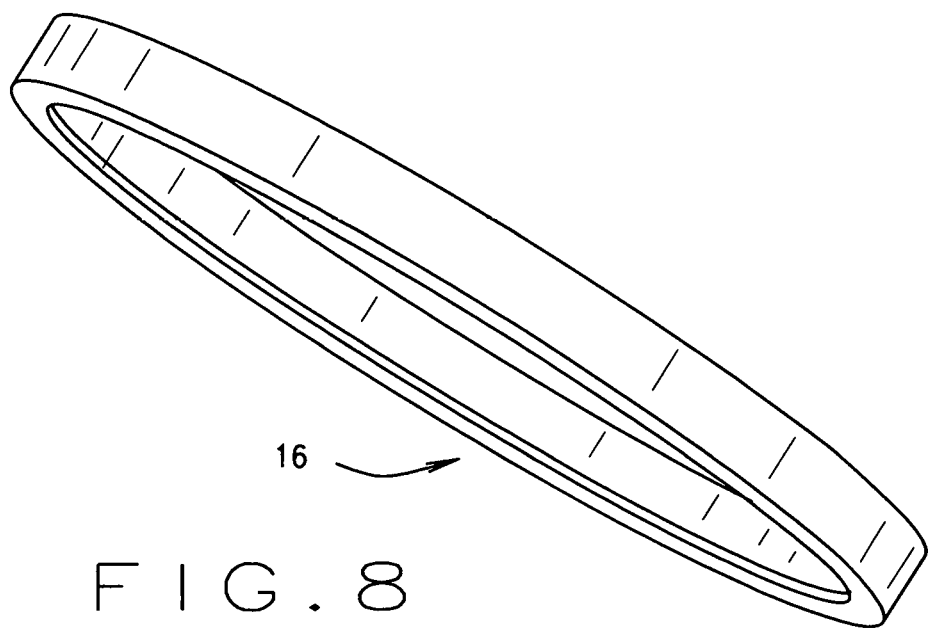
FIG. 8 is a perspective view of a sealing ring which is part of the pressure vacuum vent of the present disclosure.

FIG. 8 is a perspective view of the sealing ring 16. The sealing ring 16 is used for holding the diaphragm 14 to the pressure plate 12. The force applied to this ring 16 forces the outside diameter of the diaphragm 12 up to seal against the housing. In some instances this ring 16 can be left out so the retaining ring 20 sits on the pressure plate 12. Then the diaphragm 14 would sit on the ledge of the housing.

Figure 9:
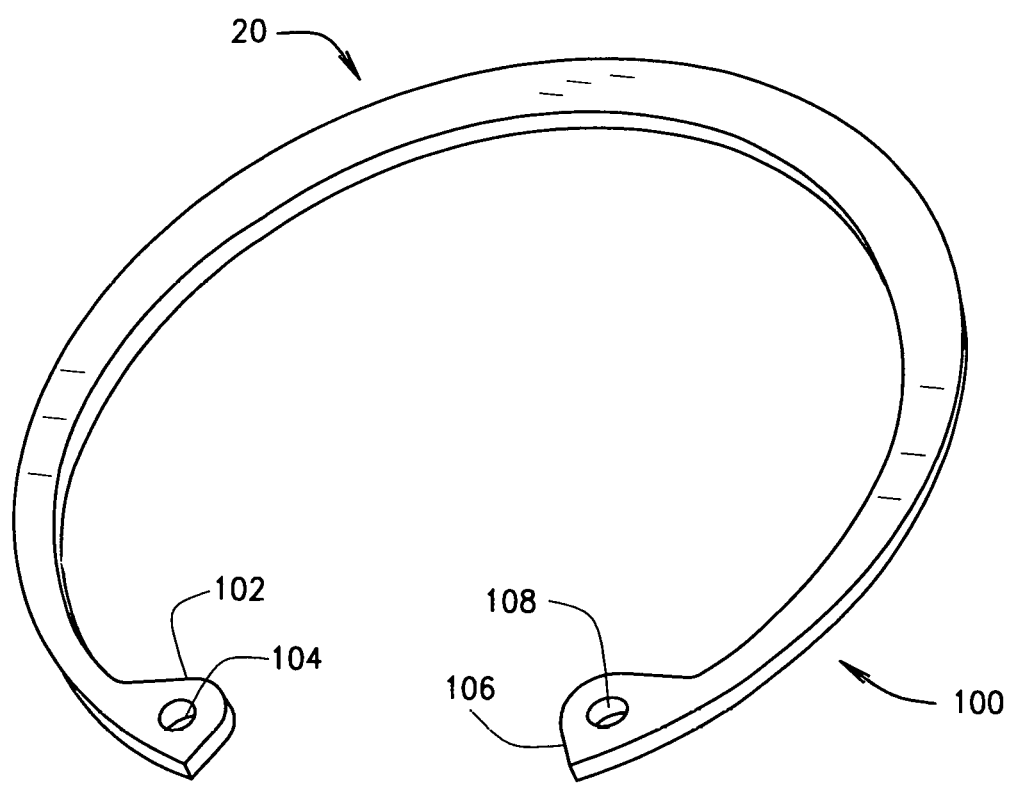
FIG. 9 is a perspective view of a retaining ring which is part of the pressure vacuum vent of the present disclosure.

With reference now to FIG. 9, a perspective view of the retaining ring 20 is depicted. The retaining ring 20 is a generally C-shaped clip 100 having a first end 102 having a first tool opening 104 and a second end 106 having a second tool opening 108. The openings 104 and 108 are provided for allowing a tool (not shown) such as a snap ring pliers to be inserted therein to open, close, or hold the clip 100.

Figure 10:
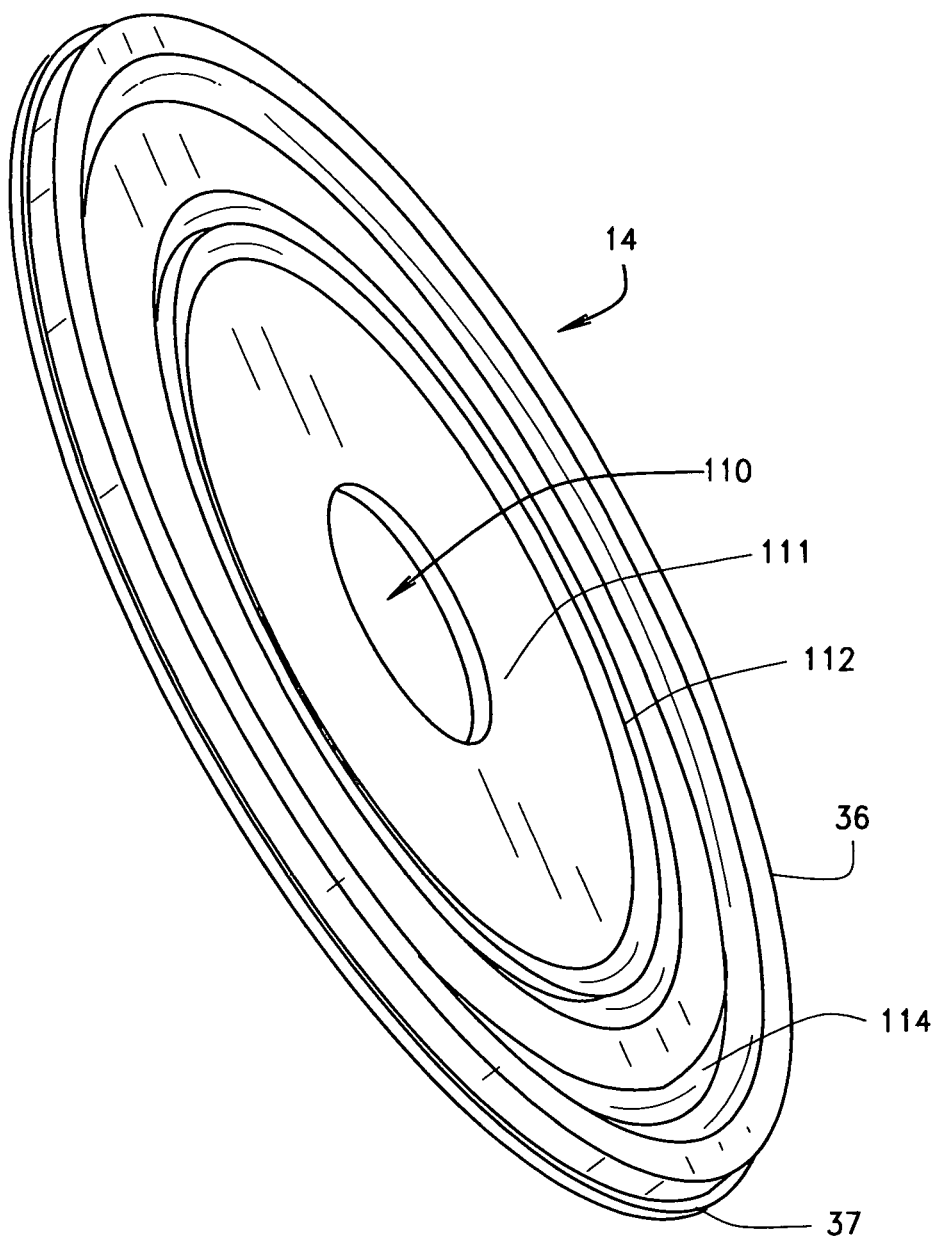
FIG. 10 is a top perspective view of a diaphragm which is part of the pressure vacuum vent of the present disclosure.

FIG. 10 is a top perspective view of the diaphragm 14. The diaphragm 14 has a central opening 110 for allowing vapors to flow through. When the sealing plate 18 pushes on the top surface 111, a fluid tight seal is formed between the bottom surface and the top 95 of the flange 96 on the pressure plate 12 a fluid tight seal is formed. The diaphragm 14 has a circumference which is sized and shaped to correspond to the circumference of the pressure plate 12 and the sealing ring 16. As has been previously indicated, the peripheral edge 37 of the diaphragm 14 is provided to extend out from between the pressure plate 12 and the sealing ring 16. When force is applied to the ring 16 by the retaining ring 20 forming an air tight seal against the housing. The groove 36, the pressure plate 12, and the sealing ring 16 provide another air tight seal for the vent 10. The diaphragm 14 may also be provided with a number of circular rib portions 112 and 114. The rib portions 112 and 114 may be used to index or center the diaphragm 14 with various other components. They also allow for extra material without increasing the diameter so the diaphragm doesn't tear when fully open.

Figure 11:
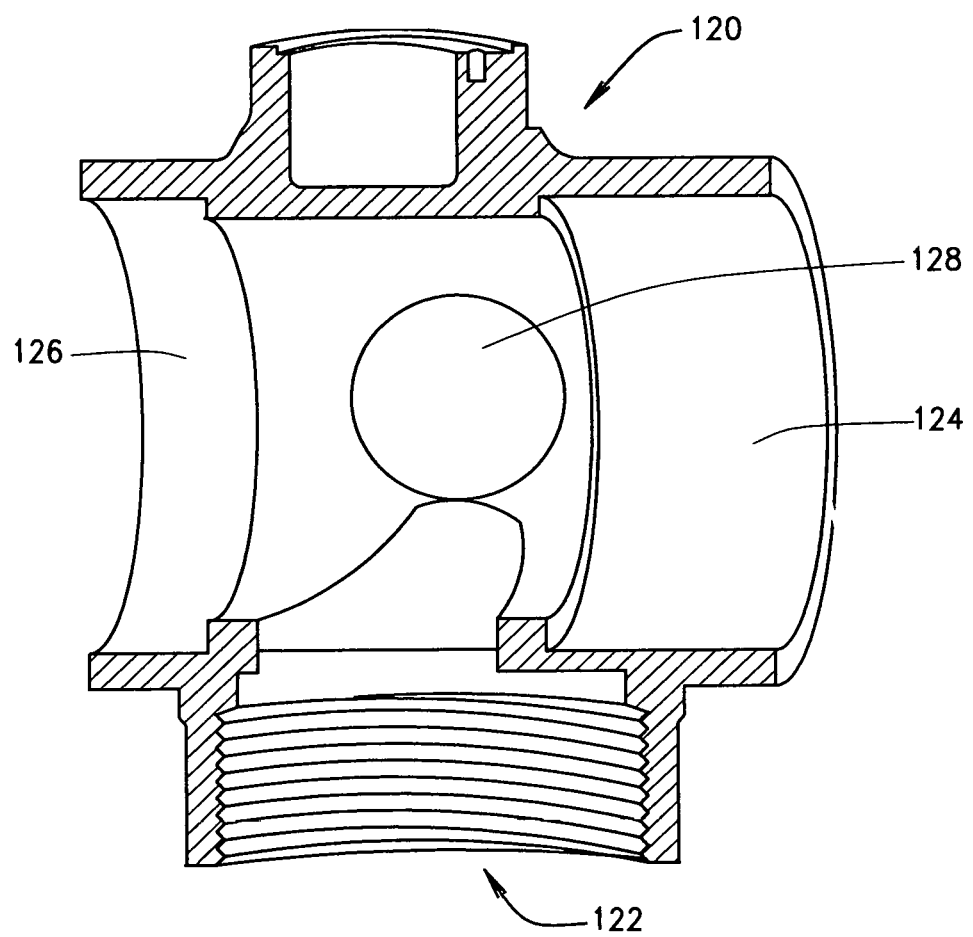
FIG. 11 is a cross-sectional view of a housing which is capable of receiving the pressure vacuum vent constructed according to the present disclosure.

Referring in particular to FIG. 11, a valve housing 120 which may be connected to a fuel storage tank vent pipe (not shown) is illustrated. The valve housing 120 has a vent pipe opening 122 in which the valve housing 120 may be connected to a vent pipe. The valve housing 120 also has a number of pressure vacuum vent openings 124, 126, and 128 in which the pressure vacuum vent 10 of the present disclosure may be inserted therein. The diameters of these openings can serve as a sealing surface with the edge 37 of the diaphragm 14. The valve housing 120 is in communication with the fuel storage tank and the pressure vacuum vents 10 inserted into the vent openings 124, 126, and 128 are in communication with the atmosphere. As can be appreciated, any increased pressure or vacuum within the fuel storage tank can be alleviated by use of the vents 10. Also, if no increased pressure is detected then the vents 10 will be sealed to not allow any atmospheric pressure to enter into the storage tank system.

Figure 12:
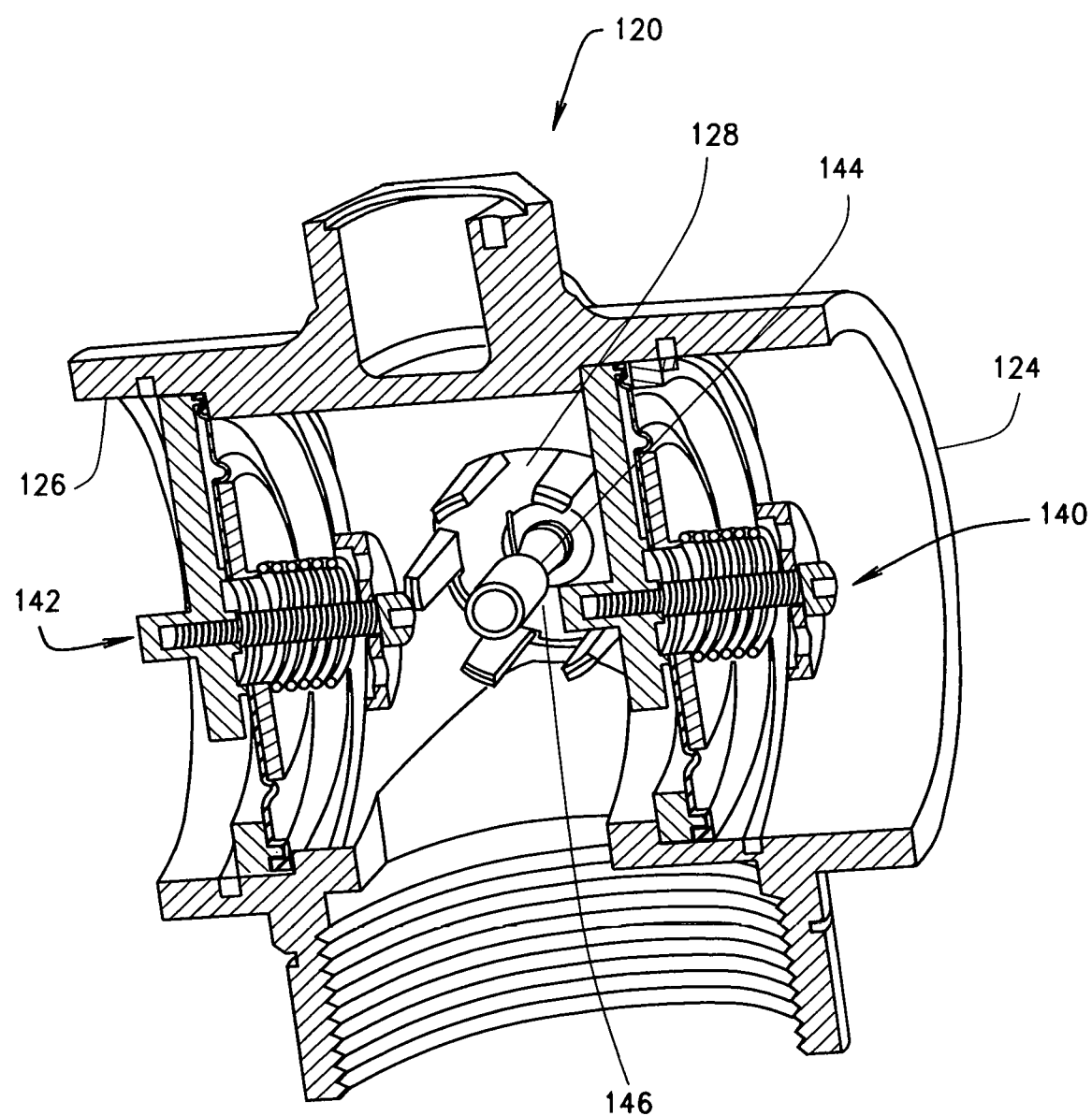
FIG. 12 is an enlarged cross-sectional view of the housing shown in FIG. 11 having the pressure vacuum vents constructed according to the present disclosure inserted therein.

FIG. 12 shows the valve housing 120 having a first pressure vacuum vent 140 inserted into the vent opening 124, a second pressure vacuum vent 142 inserted into the vent opening 126, and in this case an emergency pressure vent 144 inserted into the vent opening 128. A second vent 144 is connected via spring 146. The vents 148 and 144 are positioned to protect against an extreme high pressure condition in the fuel storage tank. The vent 142 is orientated to guard against a high vacuum condition in the fuel storage tank. The vent 140 is to protect against a high pressure condition in the fuel storage tank.

From all that has been said, it will be clear that there has thus been shown and described herein a pressure vacuum vent. It will become apparent to those skilled in the art, however, that many changes, modifications, variations, and other uses and applications of the subject pressure vacuum vent are possible and contemplated. All changes, modifications, variations, and other uses and applications which do not depart from the spirit and scope of the disclosure are deemed to be covered by the disclosure, which is limited only by the claims which follow.

We claim:
1. A pressure vacuum vent comprising:
a pressure plate having an opening and a circular wall that extends upwardly from the pressure plate;
a diaphragm positioned on the pressure plate with the diaphragm having a peripheral edge;
a sealing ring having a circular groove for sealing the peripheral edge of the diaphragm within the circular wall of the pressure plate;
a sealing plate positioned on the diaphragm;
a retaining ring for retaining the sealing ring;
a screw having a vent lid having a vent opening; and
a spring positioned between the vent lid and the sealing plate; and
wherein the retaining ring comprises a C-shaped clip having a first end having a first tool opening, and a second end having a second tool opening.

2. The pressure vacuum vent of claim 1 wherein the vent lid is initially in a closed position.

3. The pressure vacuum vent of claim 1 wherein the vent lid may be moved into an opened position by expansion of the diaphragm and compression of the spring.

4. The pressure vacuum vent of claim 1 wherein the vent may be moved into an opened position by expansion of the diaphragm and compression of the spring.

5. The pressure vacuum vent of claim 1 wherein the pressure plate further comprises a number of prongs that extend upwardly from the pressure plate with the prongs for centering the sealing plate therein.

6. The pressure vacuum vent of claim 1 wherein the pressure plate further comprises a pair of other openings formed in the plate.

7. The pressure vacuum vent of claim 1 the diaphragm further comprises a circular rib portion.

8. The pressure vacuum vent of claim 1 wherein the vent lid comprises a central opening that is used to receive the screw there through, the vent lid also has a circular ring having a side and a bottom with the side and the bottom forming a shoulder to receive the spring.

* * * * *